United States Patent
Lee et al.

(10) Patent No.: US 12,496,533 B2
(45) Date of Patent: Dec. 16, 2025

(54) METHANOL AND SULFURIC ACID CO-PRODUCTION SYSTEM

(71) Applicant: KOREA INSTITUTE OF SCIENCE AND TECHNOLOGY, Seoul (KR)

(72) Inventors: Ung Lee, Seoul (KR); Hyun Joo Lee, Seoul (KR); Hong Gon Kim, Seoul (KR); Kyeong Su Kim, Seoul (KR); Jae Hyung Im, Seoul (KR); He Won Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 651 days.

(21) Appl. No.: 17/945,796

(22) Filed: Sep. 15, 2022

(65) Prior Publication Data
US 2023/0174443 A1    Jun. 8, 2023

(30) Foreign Application Priority Data
Dec. 7, 2021  (KR) ........................ 10-2021-0173619

(51) Int. Cl.
*B01D 3/00* (2006.01)
*C01B 17/90* (2006.01)
(Continued)

(52) U.S. Cl.
CPC .............. *B01D 3/009* (2013.01); *C01B 17/90* (2013.01); *C07C 29/095* (2013.01); *C07C 67/10* (2013.01); *C07C 303/24* (2013.01)

(58) Field of Classification Search
CPC ....... B01D 3/009; C01B 17/90; C07C 29/095; C07C 67/10; C07C 303/24
See application file for complete search history.

(56) References Cited

U.S. PATENT DOCUMENTS

| | | | |
|---|---|---|---|
| 11,021,429 B1* | 6/2021 | Lee | ........................ C07C 51/493 |
| 2008/0249197 A1* | 10/2008 | Bricker | .................. C07C 67/035 |
| | | | 518/703 |

FOREIGN PATENT DOCUMENTS

| KR | 20000038791 A | 7/2000 |
|---|---|---|
| KR | 20010053838 A | 7/2001 |

(Continued)

OTHER PUBLICATIONS

Korean Office Action dated Nov. 21, 2023, in the counterpart Korean Patent Application.
(Continued)

*Primary Examiner* — Lessanework Seifu
(74) *Attorney, Agent, or Firm* — Rabin & Berdo, P.C.

(57) ABSTRACT

Disclosed is a methanol and sulfuric acid co-production system capable of producing methanol and sulfuric acid in equal equivalents. Specifically, the system includes an oxidation reaction unit configured to produce methyl bisulfate ($CH_3OSO_3H$) by reacting methane gas with an acid solution in the presence of a catalyst, a reactive distillation unit disposed downstream of the oxidation reaction unit and configured to esterify methyl bisulfate ($CH_3OSO_3H$) supplied from the oxidation reaction unit with trifluoroacetic acid ($CF_3COOH$) to obtain a product and to separate the product into methyl trifluoroacetate ($CF_3COOCH_3$) and sulfuric acid ($H_2SO_4$) through thermal distillation, and a hydrolysis reaction unit disposed downstream of the reactive distillation unit and configured to produce methanol by hydrolyzing methyl trifluoroacetate ($CF_3COOCH_3$) supplied from the reactive distillation unit, in which the reactive distillation unit recirculates the sulfuric acid resulting from separation to the oxidation reaction unit.

12 Claims, 5 Drawing Sheets

(51) Int. Cl.
   *C07C 29/09*    (2006.01)
   *C07C 67/10*    (2006.01)
   *C07C 303/24*   (2006.01)

(56) References Cited

FOREIGN PATENT DOCUMENTS

| KR | 101825158 B1   | 2/2018 |
|----|----------------|--------|
| KR | 20180048383 A  | 5/2018 |
| KR | 1020190095222 A| 8/2019 |
| KR | 102132718 B1   | 7/2020 |
| KR | 1020210100998 A| 8/2021 |

OTHER PUBLICATIONS

Hee Won Lee et al., "Pt black catalyzed methane oxidation to methyl bisulfate in H2SO4—SO3", Journal of Catalysis, 374, May 13, 2019, 230-236.

Huyen Tran Dang et al., "Enhanced Catalytic Activity of (DMSO)2PtCl2 at the Methane Oxidation in the SO3—H2SO4 System", ACS Catal., Nov. 8, 2018, 8, 11854-11862.

Zimmermann, T. et al., "Selective Methane Oxidation Catalyzed by Platinum Salts in Oleum at Turnover Frequencies of Large Scale Industrial Processes", J. Am. Chem. Soc., Sep. 5, 2016, 138, 12395-12400.

Korean Decision to Grant dated Aug. 27, 2024, in the counterpart Korean patent application.

\* cited by examiner

METHANOL AND SULFURIC ACID CO-PRODUCTION SYSTEM

CROSS-REFERENCE TO RELATED APPLICATION

This application claims under 35 U.S.C. § 119(a) the benefit of priority from Korean Patent Application No. 10-2021-0173619, filed on Dec. 7, 2021, the entire contents of which are incorporated herein by reference.

BACKGROUND

(a) Technical Field

The present disclosure relates to a methanol and sulfuric acid co-production system capable of producing methanol and sulfuric acid in equal equivalents.

(b) Background Art

Methane is regarded as an important alternative to fossil fuels as an energy source, considering the potential and economic feasibility thereof, because it is the most abundant resource on the earth and has very chemically stable properties.

However, methane exists in a gaseous phase and is difficult to transport and transfer because of the low boiling point thereof (−161.5° C.), which is undesirable. If methane is converted into liquid methanol through partial oxidation, it becomes useful as a raw material for fuel or chemical products while overcoming the disadvantages of methane gas, thus changing the paradigm of energy and resources on the earth.

Currently, synthesis of methanol from methane is carried out through a two-step reaction in which methane is converted into syngas ($CO+H_2$) via a reforming process and is then further converted into methanol. However, technology for converting methane into syngas employs a very energy-consuming process that requires a high temperature of 800° C. or higher, so thorough research into technology for direct oxidation of methane is ongoing.

For example, a method of directly oxidizing methane using oxygen ($O_2$) has a disadvantage in that methanol is decomposed at a faster rate. In addition, a method of oxidizing methane using an oxidizing agent such as $H_2O_2$ or $K_2S_2O_8$ suffers from the disadvantages of high raw-material prices and a low reaction yield of 30% or less.

In order to alleviate the above problems, a method of synthesizing a methanol precursor such as methyl bisulfate ($CH_3OSO_3H$) using fuming sulfuric acid as an oxidizing agent and solvent has been developed, which is advantageous in that the process may be performed at a low temperature of 180° C. to 220° C. and in that the yield is 80% or more.

SUMMARY OF THE DISCLOSURE

An object of the present invention is to provide a system for producing methanol through direct oxidation of methane.

Another object of the present invention is to provide a system capable of producing methanol at a low temperature under low pressure through a series of processes such as direct oxidation of methane and the like.

Still another object of the present invention is to provide a methanol and sulfuric acid co-production system having improved practicability and economic feasibility by producing methanol and sulfuric acid in equal equivalents.

The objects of the present invention are not limited to the foregoing. The objects of the present invention will be able to be clearly understood through the following description and to be realized by the means described in the claims and combinations thereof.

An embodiment of the present invention provides a methanol and sulfuric acid co-production system, including an oxidation reaction unit configured to produce methyl bisulfate ($CH_3OSO_3H$) by reacting methane gas with an acid solution in the presence of a catalyst, a reactive distillation unit disposed downstream of the oxidation reaction unit and configured to esterify methyl bisulfate ($CH_3OSO_3H$) supplied from the oxidation reaction unit with trifluoroacetic acid ($CF_3COOH$) to obtain a product and to separate the product into methyl trifluoroacetate ($CF_3COOCH_3$) and sulfuric acid ($H_2SO_4$) through thermal distillation, and a hydrolysis reaction unit disposed downstream of the reactive distillation unit and configured to produce methanol by hydrolyzing methyl trifluoroacetate ($CF_3COOCH_3$) supplied from the reactive distillation unit, in which the reactive distillation unit recirculates the sulfuric acid resulting from separation to the oxidation reaction unit.

The catalyst may include at least one selected from the group consisting of Pt(0), $PtCl_2$, $PtBr_2$, $PtI_2$, Pt, $K_2PtCl_4$, $Pt(acac)_2$, $Pt(OAc)_2$, $(bpym)PtCl_2$, $(DMSO)_2PtCl_2$, NaI, KI, LiI, $CH_3I$, $CH_3CH_2I$, $CH_3CH_2CH_2I$, and combinations thereof.

The concentration of the catalyst in the oxidation reaction unit may be 1 mM to 3 mM based on the reactant.

The acid solution may include at least one selected from the group consisting of sulfuric acid, fuming sulfuric acid, and combinations thereof.

The system may further include an unreacted material recovery unit disposed between the oxidation reaction unit and the reactive distillation unit and configured to perform gas-liquid separation of the product supplied from the oxidation reaction unit into methyl bisulfate ($CH_3OSO_3H$) and unreacted material and to recirculate the unreacted material to the oxidation reaction unit.

The unreacted material recovery unit may be configured such that a plurality of flash drums is connected in series.

The reactive distillation unit allows methyl bisulfate ($CH_3OSO_3H$) and trifluoroacetic acid ($CF_3COOH$) to react at a molar ratio of 1:1 to 1:10.

The temperature of the reactive distillation unit may be 60° C. to 300° C.

The system may further include a heat recovery unit configured to recover heat of the sulfuric acid separated in the reactive distillation unit, in which the heat recovery unit may supply the recovered heat to at least one of a product of the oxidation reaction unit and a product of the hydrolysis reaction unit.

The temperature of the hydrolysis reaction unit may be 50° C. to 300° C.

The system may further include a mixing unit disposed between the reactive distillation unit and the hydrolysis reaction unit and configured to supply a mixture of methyl trifluoroacetate ($CF_3COOCH_3$) supplied from the reactive distillation unit and water to the hydrolysis reaction unit.

The hydrolysis reaction unit may be configured to heat and distill a hydrolyzed product to separate unreacted material therefrom and to recirculate the unreacted material to the mixing unit.

The system may further include a methanol separation unit disposed downstream of the hydrolysis reaction unit and configured to separate a product supplied from the hydrolysis reaction unit into methanol and trifluoroacetic acid ($CF_3COOH$) through heating and distillation and to recirculate the trifluoroacetic acid ($CF_3COOH$) to the reactive distillation unit.

BRIEF DESCRIPTION OF THE DRAWINGS

The above and other features of the present invention will now be described in detail with reference to certain exemplary embodiments thereof illustrated in the accompanying drawings, which are given hereinbelow by way of illustration only, and thus are not limitative of the present invention, and wherein.

DETAILED DESCRIPTION

The above and other objects, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the disclosure and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Figure 1:
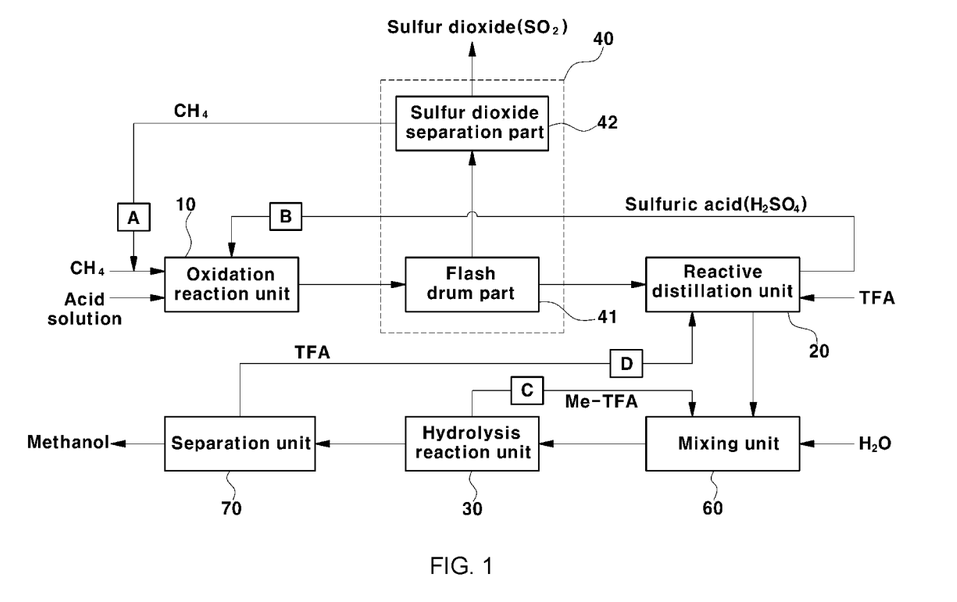
FIG. 1 is a block diagram schematically showing a methanol and sulfuric acid co-production system according to the present invention.
Figure 2:
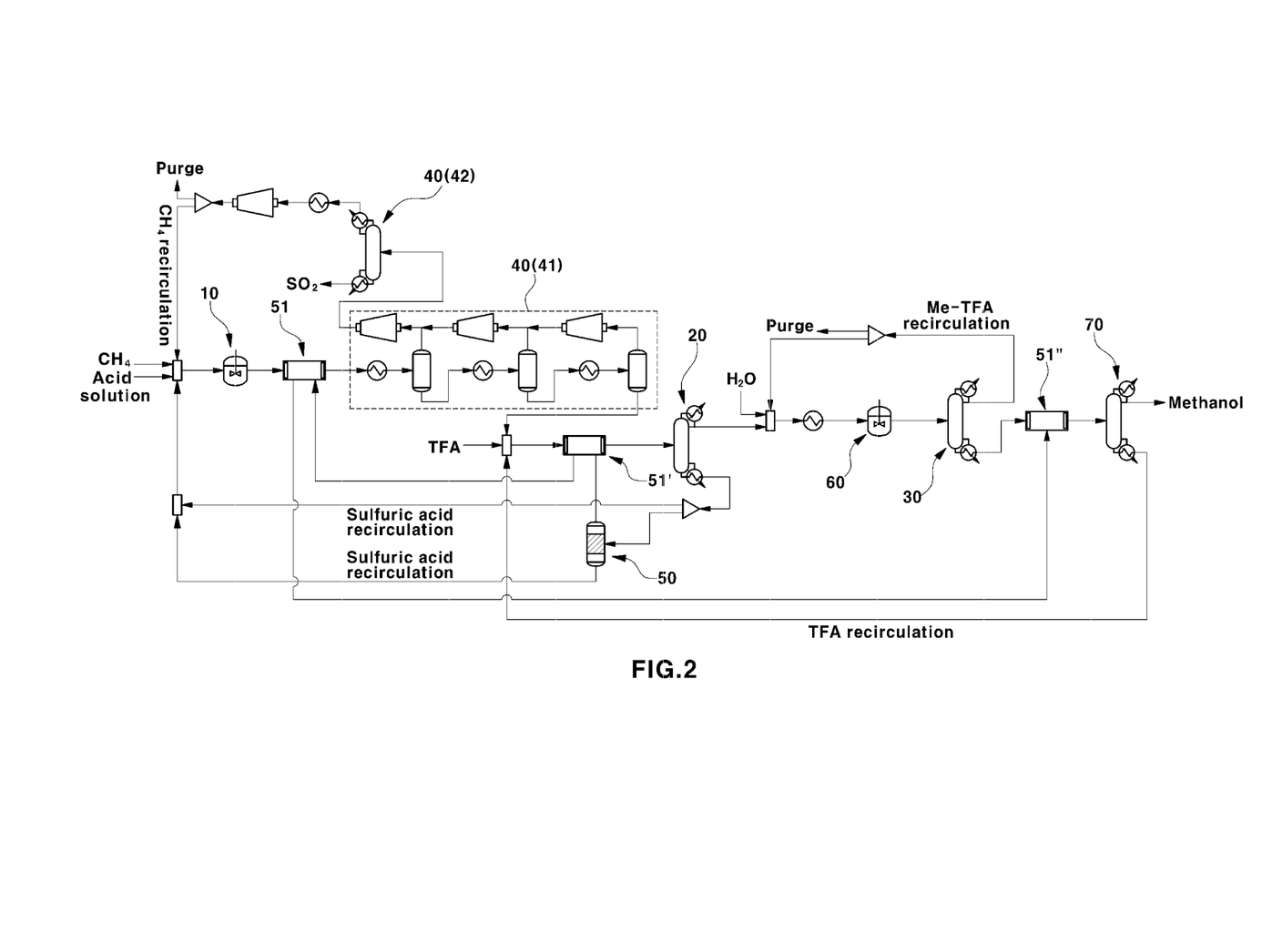
FIG. 2 shows the detailed configuration of the methanol and sulfuric acid co-production system according to the present invention.

FIG. 1 is a block diagram schematically showing a methanol and sulfuric acid co-production system according to the present invention. FIG. 2 shows the detailed configuration of the methanol and sulfuric acid co-production system according to the present invention. With reference thereto, the system includes an oxidation reaction unit 10 configured to produce methyl bisulfate ($CH_3OSO_3H$) by reacting methane gas with an acid solution in the presence of a catalyst, a reactive distillation unit 20 disposed downstream of the oxidation reaction unit 10 and configured to esterify methyl bisulfate ($CH_3OSO_3H$) supplied from the oxidation reaction unit 10 with trifluoroacetic acid ($CF_3COOH$) to obtain a product and to separate the product into methyl trifluoroacetate ($CF_3COOCH_3$) and sulfuric acid ($H_2SO_4$) through thermal distillation, and a hydrolysis reaction unit 30 disposed downstream of the reactive distillation unit 20 and configured to produce methanol by hydrolyzing methyl trifluoroacetate ($CF_3COOCH_3$) supplied from the reactive distillation unit 20. For reference, in this specification, 'upstream' and 'downstream' indicate positions before and after each unit relative to the flow direction of processes from methane gas, which is the initial reactant, to methanol, which is the final product.

Hereinafter, a detailed description will be given of individual units.

The oxidation reaction unit 10 is configured to produce methyl bisulfate ($CH_3OSO_3H$) by reacting methane gas with an acid solution, as shown in Scheme 1 below.

[Scheme 1]

$$CH_4 + 2SO_3 \longrightarrow CH_3OSO_3H + SO_2$$

The method causing the reaction of the oxidation reaction unit 10 is not particularly limited, and for example, after mixing a catalyst and an acid solution, methane gas may be supplied thereto to cause the oxidation reaction of the methane gas.

The type of catalyst is not particularly limited, and may include at least one selected from the group consisting of Pt(0), $PtCl_2$, $PtBr_2$, $PtI_2$, Pt, $K_2PtCl_4$, $Pt(acac)_2$, $Pt(OAc)_2$, $(bpym)PtCl_2$, $(DMSO)_2PtCl_2$, NaI, KI, LiI, $CH_3I$, $CH_3CH_2I$, $CH_3CH_2CH_2I$, and combinations thereof. Preferably, a platinum-based catalyst is used, and in particular, the use of $(DMSO)_2PtCl_2$ is capable of obtaining methyl bisulfate ($CH_3OSO_3H$) at high yield.

Here, 'acac' represents acetylacetonate, 'OAc' represents acetate, 'bpym' represents 2,2'-bipyrimidine, and 'DMSO' represents dimethyl sulfoxide.

The concentration of the catalyst may be 1 mM to 3 mM based on the total number of moles of reactants in the oxidation reaction unit 10. When the concentration of the catalyst falls within the above numerical range, methyl bisulfate ($CH_3OSO_3H$) may be produced at high yield.

Any acid solution may be used regardless of the type and concentration of the acid therein, so long as it is an acid solution commonly used in the technical field to which the present invention belongs. For example, at least one selected from the group consisting of sulfuric acid, fuming sulfuric acid (Oleum), and combinations thereof may be included.

Here, fuming sulfuric acid is a solution of sulfur trioxide ($SO_3$) in sulfuric acid, and the amount of $SO_3$ may be varied in a wide range, and fuming sulfuric acid containing 1-60 wt % $SO_3$ may be typically used, and more preferably fuming sulfuric acid containing 20 wt % $SO_3$ is used. For example, fuming sulfuric acid containing 20 wt % $SO_3$ means that 20 g of $SO_3$ is contained in a total of 100 g of fuming sulfuric acid.

The temperature of the oxidation reaction unit 10 may be 150° C. to 250° C. This temperature is the temperature at which the oxidation reaction of Scheme 1 occurs. If the temperature of the oxidation reaction unit 10 is lower than 150° C., the activity of the catalyst may be lowered, so methyl bisulfate ($CH_3OSO_3H$) may be produced only in a small amount, whereas if it exceeds 250° C., the catalyst may be deactivated.

The oxidation reaction of Scheme 1 may be carried out for 30 minutes to 12 hours. If the reaction time exceeds 12 hours, the yield of methyl bisulfate ($CH_3OSO_3H$) does not increase any further.

The system may further include an unreacted material recovery unit 40 disposed downstream of the oxidation reaction unit 10.

The unreacted material recovery unit 40 may include a flash drum part 41 configured to perform gas-liquid separation of the product supplied from the oxidation reaction unit 10 into methyl bisulfate ($CH_3OSO_3H$) and unreacted material and a sulfur dioxide separation part 42 configured to separate and remove sulfur dioxide ($SO_2$) from the unreacted material separated in the flash drum part 41.

The flash drum part 41 may be configured such that a plurality of flash drums is connected in series, as shown in FIG. 2. The upstream flash drums serve to separate the unreacted material from the product of the oxidation reaction unit 10 and recirculate the same (direct recirculation or recirculation via the sulfur dioxide separation part 42), and the downstream flash drums receive the product from which the unreacted material is primarily removed from the upstream flash drums and operate in the same manner as above. The number of flash drums is not particularly limited, and an appropriate number of flash drums may be connected in series in consideration of separation efficiency and the like.

The unreacted material from which sulfur dioxide ($SO_2$) is removed in the sulfur dioxide separation part 42 may be recirculated to the oxidation reaction unit 10 (A).

The reactive distillation unit 20 may be configured to esterify methyl bisulfate ($CH_3OSO_3H$) supplied from the oxidation reaction unit 10 or the unreacted material recovery unit 40 with trifluoroacetic acid ($CF_3COOH$, TFA), as shown in Scheme 2 below.

[Scheme 2]

Also, the reactive distillation unit 20 is capable of separating the reactants into methyl trifluoroacetate ($CF_3COOCH_3$) and sulfuric acid ($H_2SO_4$) through thermal distillation in coincidence with the reaction of Scheme 2.

Specifically, the product of the oxidation reaction unit 10 contains methyl bisulfate ($CH_3OSO_3H$) and excess sulfuric acid and catalyst. Since methyl bisulfate ($CH_3OSO_3H$) and sulfuric acid have hydrogen bonding, the use of typical vacuum distillation may excessively consume energy, and also, methyl bisulfate ($CH_3OSO_3H$) may be converted into dimethyl sulfate due to disproportionation, which is undesirable. Various methods have been described above, but methyl bisulfate ($CH_3OSO_3H$) and sulfuric acid are not actually separated from each other, and are mostly used as they are for methanol production. In this case, due to the high-concentration sulfuric acid present as the solvent, excess water is required, and furthermore, the high-concentration sulfuric acid is changed to a low concentration and becomes waste, which is undesirable. Therefore, in order to obtain high-purity methanol, processes of separating methyl bisulfate ($CH_3OSO_3H$) from sulfuric acid and purifying the same are absolutely necessary.

In order to solve the above problem, in the present invention, methyl trifluoroacetate ($CF_3COOCH_3$, Me-TFA) having a lower boiling point than other materials is synthesized through an equilibrium reaction by adding methyl bisulfate ($CH_3OSO_3H$) with trifluoroacetic acid ($CF_3COOH$, TFA) as shown in Scheme 2.

Methyl trifluoroacetate ($CF_3COOCH_3$, Me-TFA) having a boiling point of 43° C. may be easily removed from sulfuric acid through distillation under atmospheric pressure at 60° C. to 300° C.

Specifically, when the temperature of the reactive distillation unit 20 is raised to 60° C. to 300° C., methyl bisulfate ($CH_3OSO_3H$) reacts with trifluoroacetic acid ($CF_3COOH$, TFA) and is thus converted into sulfuric acid ($H_2SO_4$) and methyl trifluoroacetate ($CF_3COOCH_3$, Me-TFA), and methyl trifluoroacetate ($CF_3COOCH_3$, Me-TFA) having a low boiling point is distilled and supplied to the downstream unit.

If the temperature of the reactive distillation unit 20 is lower than 60° C., the reaction time becomes too long, whereas if it exceeds 300° C., some sulfuric acid may be distilled out therewith.

The reactive distillation unit 20 allows methyl bisulfate ($CH_3OSO_3H$) and trifluoroacetic acid ($CF_3COOH$) to react at a molar ratio of 1:1 to 1:10. When the molar ratio of the two components falls within the above numerical range, conversion efficiency to methyl trifluoroacetate ($CF_3COOCH_3$) may be increased.

The reactive distillation unit 20 is capable of recirculating the sulfuric acid resulting from separation to the oxidation reaction unit 10 (B) so that the sulfuric acid may be used as an acid solution in the oxidation reaction unit 10. Therefore, when the system starts to operate stably, the amount of the acid solution that is newly supplied to the oxidation reaction unit 10 may be decreased, which may greatly contribute to the scalability and economic feasibility of the system.

The reactive distillation unit 20 may be a single device, or may be composed of a reactor and a distillation column. An appropriate device may be introduced depending on the conditions in which the system according to the present invention is used.

Also, the system may further include a heat recovery unit 50 configured to recover heat from the sulfuric acid separated in the reactive distillation unit 20 as shown in FIG. 2.

The heat recovery unit 50 is configured to recover the heat from the sulfuric acid and provide the same to heating fluid, whereby the heating fluid passes through heat exchangers 51 and 51' installed on the flow path for moving the product of the oxidation reaction unit 10 and/or a heat exchanger 51" installed on the flow path for moving the product of the hydrolysis reaction unit 30 to be described later to thus supply heat required for each product.

Through the heat recovery unit 50, the amount of heat required by the entire system may be supplied from within, which may also greatly help to increase the efficiency of the system.

The heat recovery unit 50 may recover all or some of the heat of sulfuric acid separated in the reactive distillation unit 20, which may be appropriately adjusted in consideration of the amount of heat required by the system.

The heat recovery unit 50 may further include additional components such as a regenerator (not shown) for the catalyst remaining in the sulfuric acid.

The hydrolysis reaction unit 30 is configured to produce methanol by hydrolyzing methyl trifluoroacetate ($CF_3COOCH_3$) supplied from the reactive distillation unit 20 as shown in Scheme 3 below.

[Scheme 3]

$CF_3COOCH_3 + H_2O \longrightarrow CF_3COOH + CH_3OH$

Since high-purity methyl trifluoroacetate ($CF_3COOCH_3$) having almost no impurities and unreacted material is supplied from the reactive distillation unit 20, high-purity methanol may be obtained without any special device or process.

The temperature of the hydrolysis reaction unit 30 may be 25° C. to 300° C. or 50° C. to 300° C. If the temperature exceeds 300° C., additional energy may be consumed without an increase in yield, so efficiency may be decreased as a result.

Also, the system may further include a mixing unit 60 disposed between the reactive distillation unit 20 and the hydrolysis reaction unit 30.

The mixing unit 60 may be configured simply to mix methyl trifluoroacetate ($CF_3COOCH_3$) supplied from the reactive distillation unit 20 and water ($H_2O$) and supply the resulting mixture to the hydrolysis reaction unit 30. Here, the hydrolysis reaction unit 30 may further include a distillation column (not shown) configured to separate the hydrolyzed product into methanol and unreacted material through thermal distillation and to recirculate the unreacted material, particularly methyl trifluoroacetate ($CF_3COOCH_3$, Me-TFA), to the mixing unit 60 (C).

The system may further include a separation unit 70 disposed downstream of the hydrolysis reaction unit 30.

The separation unit 70 may be configured to separate the product supplied from the hydrolysis reaction unit 30 according to Scheme 3 into methanol and trifluoroacetic acid ($CF_3COOH$, TFA) through thermal distillation.

The separation unit 70 is capable of recirculating trifluoroacetic acid ($CF_3COOH$, TFA) separated from methanol to the reactive distillation unit 20 (D). Therefore, when the system starts to operate stably, the amount of trifluoroacetic acid ($CF_3COOH$, TFA) that is newly supplied to the reactive distillation unit 20 may be decreased, which may greatly contribute to the scalability and economic feasibility of the system.

A better understanding of the present invention may be obtained through the following examples. However, these examples are to be not construed as narrowing or limiting the scope and content of the present invention. In addition, based on the disclosure of the present invention including the following examples, it is clear that a person skilled in the art may easily carry out the present invention in a manner for which no specific experimental results are presented, and it goes without saying that such variations and modifications fall within the scope of the appended claims.

1. Type and Concentration of Catalyst in Oxidation Reaction Unit

Fuming sulfuric acid serving as an acid solution was placed in a high-pressure reactor made of SUS, and $(DMSO)_2PtCl_2$, $(bpym)PtCl_2$, $K_2PtCl_4$, and $PtCl_2$ catalysts were added at various concentrations in the range of 0 mM to 50 mM. Thereafter, the high-pressure reactor was filled with methane gas at 20 bar. The temperature of the high-pressure reactor was raised to 180° C., and oxidation was carried out at 180° C. for 3 hours. When the reaction time had passed, the temperature of the high-pressure reactor was lowered, and then the gaseous material was discharged. After opening the high-pressure reactor and quantifying the resulting product, the yield of methyl bisulfate (MBS) was calculated using Equation 1 below. The results thereof are shown in FIG. 3.

Yield of $MBS$[%]=amount of $MBS$ produced (mmol)×2/amount of oxidizing agent used (mmol)    [Equation 1]

Figure 3:
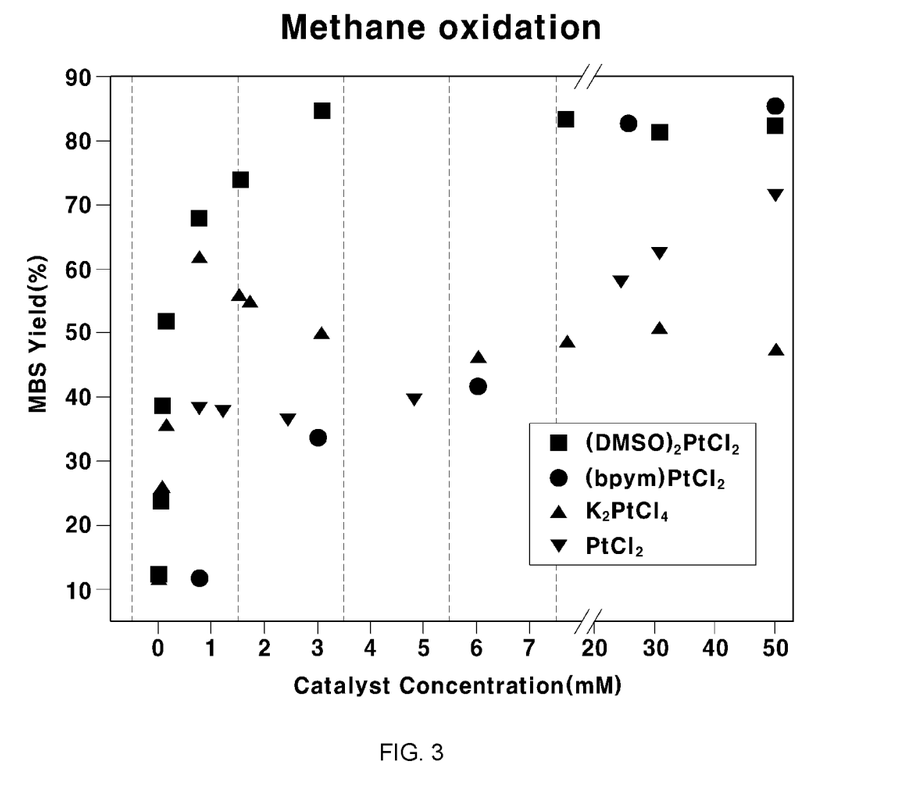
FIG. 3 shows the results of measurement of the yield of methyl bisulfate depending on the type and concentration of a catalyst in an oxidation reaction unit according to an embodiment.

With reference to FIG. 3, the yield of methyl bisulfate (MBS) was found to be the greatest when the $(DMSO)_2PtCl_2$ catalyst was used at a concentration of about 1 mM to 3 mM. When the concentration of the catalyst exceeded 3 mM, although the amount of the catalyst was increased, the yield was not increased, thus deteriorating efficiency, which is undesirable.

2. Production of Methyl Trifluoroacetate ($CF_3COOCH_3$)

In a reactive distillation unit according to the present invention, the product containing methyl bisulfate ($CH_3OSO_3H$) was added with trifluoroacetic acid ($CF_3COOH$) and then converted into methyl trifluoroacetate ($CF_3COOCH_3$) through an equilibrium reaction.

Here, methyl bisulfate ($CH_3OSO_3H$) and trifluoroacetic acid ($CF_3COOH$) were allowed to react at a molar ratio of 1:2.49.

Figure 4:
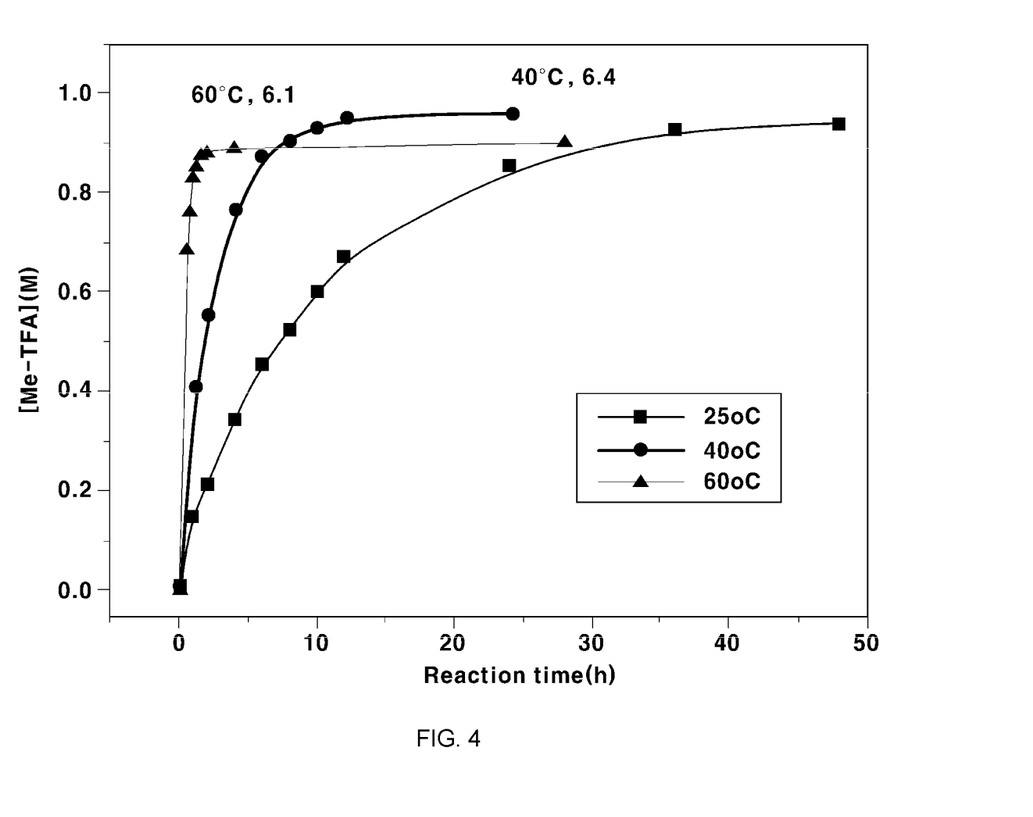
FIG. 4 shows the results of measurement of the amount of methyl trifluoroacetate that is produced depending on the temperature of a reactive distillation unit according to an embodiment.

Moreover, the temperature of the reactive distillation unit was adjusted to 25° C., 40° C., and 60° C., and the amount of methyl trifluoroacetate ($CF_3COOCH_3$) that was produced depending on the temperature was measured. The results thereof are shown in FIG. 4. With reference thereto, when the temperature of the reactive distillation unit was 60° C., the reaction was found to occur the fastest.

3. Production of Methanol

In a hydrolysis reaction unit according to the present invention, methanol was synthesized by hydrolyzing methyl trifluoroacetate ($CF_3COOCH_3$) with water.

Figure 5:
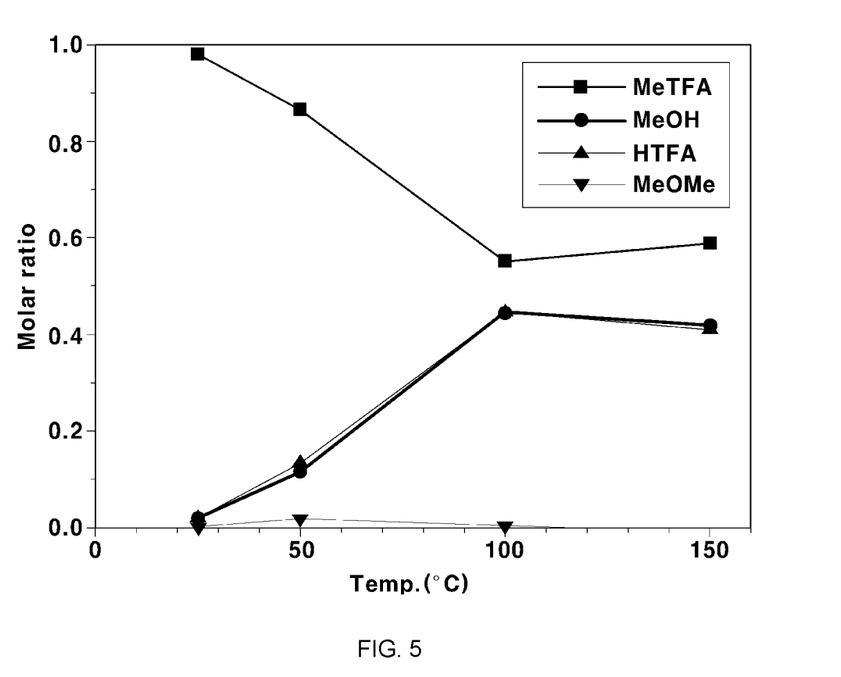
FIG. 5 shows the results of measurement of the amount of each component depending on the temperature of a hydrolysis reaction unit according to an embodiment.

Here, the temperature of the hydrolysis reaction unit was adjusted to each of 25° C., 50° C., 100° C., and 150° C., and the amount of each component depending on the temperature was measured. The results thereof are shown in FIG. 5.

With reference thereto, it can be found that, when the temperature of the hydrolysis reaction unit was 50° C. to 100° C., hydrolysis occurred, and thus methanol was synthesized.

As is apparent from the above description, according to the present invention, a system for producing methanol through direct oxidation of methane can be provided.

According to the present invention, a system capable of producing methanol at a low temperature under low pressure through a series of processes such as direct oxidation of methane and the like can be provided.

According to the present invention, a methanol and sulfuric acid co-production system having improved practicability and economic feasibility because methanol and sulfuric acid are produced in equal equivalents can be provided.

The effects of the present invention are not limited to the above-mentioned effects. It should be understood that the effects of the present invention include all effects that can be inferred from the description of the present invention.

As described hereinbefore, the present invention has been described in detail with reference to test examples and embodiments. However, the scope of the present invention is not limited to the aforementioned test examples and examples, and various modifications and improved modes of the present invention using the basic concept of the present invention defined in the accompanying claims are also incorporated in the scope of the present invention.

What is claimed is:

1. A methanol and sulfuric acid co-production system, comprising:
    an oxidation reaction unit configured to produce methyl bisulfate ($CH_3OSO_3H$) by reacting methane gas with an acid solution in the presence of a catalyst;
    a reactive distillation unit disposed downstream of the oxidation reaction unit and configured to esterify methyl bisulfate ($CH_3OSO_3H$) supplied from the oxidation reaction unit with trifluoroacetic acid ($CF_3COOH$) to obtain a product and to separate the product into methyl trifluoroacetate ($CF_3COOCH_3$) and sulfuric acid ($H_2SO_4$) through thermal distillation; and
    a hydrolysis reaction unit disposed downstream of the reactive distillation unit and configured to produce methanol by hydrolyzing methyl trifluoroacetate ($CF_3COOCH_3$) supplied from the reactive distillation unit,
    wherein the reactive distillation unit recirculates the sulfuric acid resulting from separation to the oxidation reaction unit; and
    further comprising an unreacted material recovery unit disposed between the oxidation reaction unit and the reactive distillation unit and configured to perform gas-liquid separation of a product supplied from the oxidation reaction unit into methyl bisulfate ($CH_3OSO_3H$) and an unreacted material and to recirculate the unreacted material to the oxidation reaction unit.

2. The methanol and sulfuric acid co-production system of claim 1, wherein the catalyst comprises at least one of Pt (0), $PtCl_2$, $PtBr_2$, $PtI_2$, $K_2PtCl_4$, $Pt(acac)_2$, $Pt(OAc)_2$, (bpym)$PtCl_2$, $(DMSO)_2PtCl_2$, NaI, KI, LiI, $CH_3I$, $CH_3CH_2I$, $CH_3CH_2CH_2I$, or any combination thereof.

3. The methanol and sulfuric acid co-production system of claim 1, wherein a concentration of the catalyst in the oxidation reaction unit ranges from about 1 mM to 3 mM based on a reactant.

4. The methanol and sulfuric acid co-production system of claim 1, wherein the acid solution comprises at least one of sulfuric acid, fuming sulfuric acid, or any combination thereof.

5. The methanol and sulfuric acid co-production system of claim 1, wherein the unreacted material recovery unit comprises a plurality of flash drums connecting in series.

6. The methanol and sulfuric acid co-production system of claim 1, wherein the reactive distillation unit allows methyl bisulfate ($CH_3OSO_3H$) and trifluoroacetic acid ($CF_3COOH$) to react at a molar ratio of about 1:1 to 1:10.

7. The methanol and sulfuric acid co-production system of claim 1, wherein a temperature of the reactive distillation unit ranges from about 60° C. to 100° C.

8. The methanol and sulfuric acid co-production system of claim 1, wherein a temperature of the hydrolysis reaction unit ranges from about 50° C. to 100° C.

9. The methanol and sulfuric acid co-production system of claim 1, further comprising a mixing unit disposed between the reactive distillation unit and the hydrolysis reaction unit and configured to supply a mixture of methyl trifluoroacetate ($CF_3COOCH_3$) supplied from the reactive distillation unit and water to the hydrolysis reaction unit.

10. The methanol and sulfuric acid co-production system of claim 1, further comprising a methanol separation unit disposed downstream of the hydrolysis reaction unit and configured to separate a product supplied from the hydrolysis reaction unit into methanol and trifluoroacetic acid ($CF_3COOH$) through thermal distillation and to recirculate the trifluoroacetic acid ($CF_3COOH$) to the reactive distillation unit.

11. A methanol and sulfuric acid co-production system, comprising:
    an oxidation reaction unit configured to produce methyl bisulfate ($CH_3OSO_3H$) by reacting methane gas with an acid solution in the presence of a catalyst;
    a reactive distillation unit disposed downstream of the oxidation reaction unit and configured to esterify methyl bisulfate ($CH_3OSO_3H$) supplied from the oxidation reaction unit with trifluoroacetic acid ($CF_3COOH$) to obtain a product and to separate the product into methyl trifluoroacetate ($CF_3COOCH_3$) and sulfuric acid ($H_2SO_4$) through thermal distillation; and
    a hydrolysis reaction unit disposed downstream of the reactive distillation unit and configured to produce methanol by hydrolyzing methyl trifluoroacetate ($CF_3COOCH_3$) supplied from the reactive distillation unit, wherein the reactive distillation unit recirculates the sulfuric acid resulting from separation to the oxidation reaction unit, further comprising a heat recovery unit configured to recover heat of the sulfuric acid separated in the reactive distillation unit, wherein the heat recovery unit supplies the recovered heat to at least one of a product of the oxidation reaction unit and a product of the hydrolysis reaction unit.

12. A methanol and sulfuric acid co-production system, comprising:
    an oxidation reaction unit configured to produce methyl bisulfate ($CH_3OSO_3H$) by reacting methane gas with an acid solution in the presence of a catalyst;
    a reactive distillation unit disposed downstream of the oxidation reaction unit and configured to esterify methyl bisulfate ($CH_3OSO_3H$) supplied from the oxidation reaction unit with trifluoroacetic acid ($CF_3COOH$) to obtain a product and to separate the product into methyl trifluoroacetate ($CF_3COOCH_3$) and sulfuric acid ($H_2SO_4$) through thermal distillation; and a hydrolysis reaction unit disposed downstream of the reactive distillation unit and configured to produce methanol by hydrolyzing methyl trifluoroacetate ($CF_3COOCH_3$) supplied from the reactive distillation unit, wherein the reactive distillation unit recirculates the sulfuric acid resulting from separation to the oxidation reaction unit, further comprising a mixing unit disposed between the reactive distillation unit and the hydrolysis reaction unit and configured to supply a mixture of methyl trifluoroacetate ($CF_3COOCH_3$) supplied from the reactive distillation unit and water to the hydrolysis reaction unit wherein the hydrolysis reaction unit is configured to distill a hydrolyzed product to separate an unreacted material therefrom and to recirculate the unreacted material to the mixing unit.

* * * * *